May 31, 1949.  W. A. EDSON ET AL  2,471,419
TUNABLE RESONANT CAVITY WITH ADJUSTABLE WALLS
Filed July 7, 1944
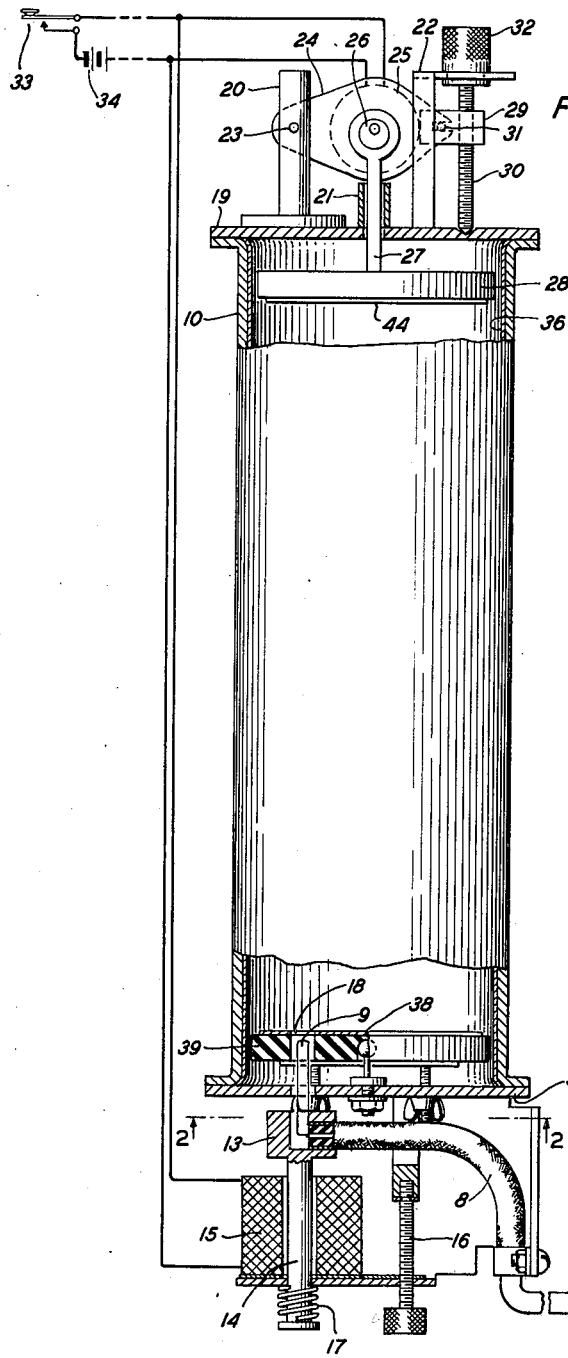
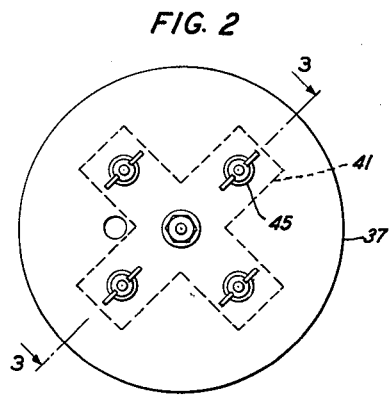
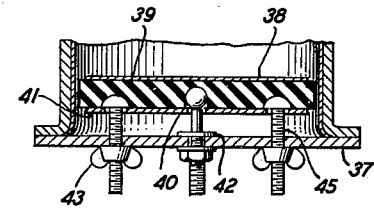
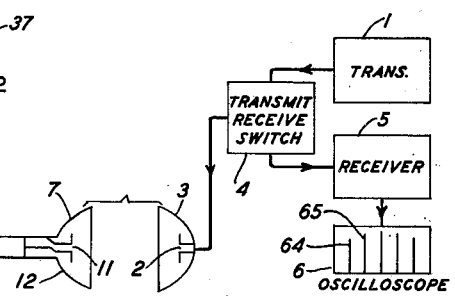
INVENTORS W. A. EDSON
W. F. KANNENBERG
BY
E. V. Griggs
ATTORNEY Patented May 31, 1949

2,471,419

UNITED STATES PATENT OFFICE 2,471,419

TUNABLE RESONANT CAVITY WITH ADJUSTABLE WALLS

William A. Edson, New York, N. Y., and Walter F. Kannenberg, Lyndhurst, N. J., assignors to Bell Telephone Laboratories, Incorporated, New York, N. Y., a corporation of New York Application July 7, 1944, Serial No. 543,830

5 Claims. (Cl. 178—44)

This invention relates to testing equipment for ascertaining and adjusting the condition of object locators using electrical echoes to determine the distance and direction of remote objects.

An object of the invention is to provide a convenient test apparatus for an air-borne radar which may be installed on an airplane for use in checking the operation of the radar while the airplane on which the radio locator is carried is in flight.

A principal feature of the invention is an electrical resonator which consists of a chamber of conducting material and which serves to build up and store energy of oscillations of a desired given frequency and mode of oscillation.

Another object of the invention is to provide electrical resonators and more particularly systems and apparatus involving electrical resonators for discriminating strongly against undesired modes of oscillation.

An additional object of the invention is to accentuate oscillations of a resonance chamber of a particular desired mode while at the same time discriminating strongly against oscillations of a different mode occurring at the same or a closely adjacent frequency.

A still further object of the invention is to separate oscillations of a resonance chamber of lower resonance persistence from different mode oscillations of the same frequency of a higher resonance persistence and to suppress the oscillations of lower persistence.

Another object of the invention is to take advantage of the high resonance persistence of higher mode circular transverse electrical oscillations of a cylindrical chamber resonator.

Still another object of the invention is to overcome the deleterious effects of misalignment of opposite plane walls of an electrical resonance chamber.

Object location by the use of electrical echoes involves the transmission of sharply directed beams of electrical waves which impinge upon objects to be located and are reflected back to an observation point at which the direction of the beam and the time required for its excursion to the object and back to the observation point are correlated. The beam may consist of a sequence of very short impulses or trains of high frequency oscillations the time interval separating successive trains being many times as long as that of a wave train. Inasmuch as the oscillations may be of the order of a few centimeters in length the receiver of the reflected waves should be tuned closely to the frequency of the transmitted oscillations. In some cases as, for example, in air-borne apparatus a considerable period may elapse after leaving the ground before the object locator is put into operation. With changes in temperature the transmitter and receiver although originally in tune may drift out of tuning alignment sufficiently far to make reception of an echo impossible. Ordinarily high power pulses are employed and the receiver is desensitized during their transmission to avoid overload or destruction of its sensitive elements. Tuning must therefore be effected by reflected energy received at times between pulses when the receiver is sensitive. If a good target at known distance be available it may be used in the retuning process but if it is not something must be done to provide a substitute. For this purpose a so-called phantom target may be used comprising an apparatus carried by the airship and responsive to the transmitted object locating pulse to build up an oscillating field of the same frequency. Upon cessation of the transmitted pulse the phantom target may send back to the object locator receiver a portion of the energy which it has stored up to simulate a reflected pulse. This energy persists for a relatively long time and is therefore more satisfactory for tuning than the brief pulses reflected from an actual target.

Since the effectiveness of the phantom target depends upon its ability to store up high frequency energy of a pulse in the form of oscillations of unchanged frequency and to return some of the energy at the termination of the pulse a very persistent low loss resonator or oscillation system is essential. Moreover, it must be capable, though highly selective, of variation of its resonance frequency so as to permit the observer to retune it to follow the arbitrary variations which may occur in the frequency of the high power transmitter. In addition it is extremely desirable that the resonator behave as a single frequency device so as not to introduce confusion into the tuning operation.

In accordance with the invention an electrical resonance chamber is used in a phantom target system. To systematize and expedite location of the transmitter frequency the resonance chamber is provided with a tuning apparatus capable of exploring the entire range which the transmitter may traverse. Moreover, this tuning apparatus is motor-driven so that the tuning range is covered uniformly and rapidly enough to reduce the delay incident to the whole process of retuning the receiver of the object locator. In order to cause the resonator to behave at any instant as a single frequency apparatus a cylindrical chamber is employed and its design is made such as to enable a mode of oscillation to be used at which the device exhibits high resonance persistence. It has been found that for such a mode the persistence or Q is somewhat affected by the perpendicularity of the end of the tuner or piston face with respect to the circular wall of the cylinder but it is greatly affected by the parallelism of the opposite end walls. Accordingly, one of these walls is pivotally mounted to enable a nice adjustment of the plane of the wall with respect to the opposite wall. In order to reduce the deleterious effect upon this persistence of oscillations of other modes which may tend to be set up at the same or at closely adjacent frequency provision is made for attenuating such undesired oscillations. This may take the form of a peripheral gap about one or both of the parallel walls to attenuate the undesired oscillations with small effect upon those desired. Additional attenuation may be had by placing just back of the gaps dielectric members which may absorb energy of oscillation fields impressed effectively upon them by the gaps.

Other objects and aspects of the invention will be apparent from a consideration of the detailed specification taken in connection with the accompanying drawing in which:

Fig. 1 shows a testing system comprising a radio object locator indicated in block diagram together with a phantom target circuit and apparatus, the apparatus being partly broken away to display details, the whole constituting a radio object locator test system;

Fig. 2 is a plan view of the resonance chamber from the plane 2—2 of Fig. 1 as viewed in the direction of the arrows; and Fig. 3 is a longitudinal section of the lower portion of the resonance chamber along the plane 3—3 of Fig. 2, viewed in the direction of the arrows.

Referring to Fig. 1 there is shown in block diagram a radio object locator together with a phantom target equipment for testing the object locator. The object locator itself consists of the customary radio transmitter 1 which may, for example, be a magnetron with provision for pulsing it to cause it to emit pulses or trains of oscillations, the pulse being of very brief duration and the oscillations of very high frequency as, for example, a pulse of one microsecond and oscillations of 3 centimeters wavelength. The transmitter 1 is connected to supply energy to a radiating element shown conventionally as a dipole 2 with a surrounding parabolic reflector 3. The energy transfer path extends from the transmitter 1 to the radiator 2 through an energy control device 4 or electronic transmit-receive switch known in the art as a "TR box" which may be of any well-known type. Also connected to the radiator 2 through the transmit receive switch is the radio receiver 5 of the radio object locator, the transmit receive switch serving during transmission of pulses from transmitter 1 effectively to disconnect the receiver 5 in order to protect it against the otherwise very harmful effects of the high power energy from transmitter 1. The element 4 accordingly serves as an outgoing path for high power transmitter impulses at the same time protecting the receiver from these pulses. After cessation of the pulses the element 4 restores to normal condition to permit radio receiver 5 to again become sensitive and to provide an inbound energy transfer path from the antenna 2 to the receiver 5. Connected to the radio receiver 5 is a cathode ray oscilloscope apparatus 6 to present a visible record of the period of time between emission of the transmitter impulse and receipt of the returning impulse reflected by the remote object.

For testing the radio object locator there is provided an energy pickup device 7 exposed to the field of the impulses outgoing from radiator 2. A coaxial conductor 8 connects the energy pickup device 7 to the energy transfer loop 9 and a resonance chamber 10 with the internal electromagnetic field of which the coupling loop 9 may at times be coupled. The pickup device 7 may comprise a dipole 11 with a parabolic reflector 12 to enhance sensitivity.

The coupling loop 9 is preferably carried by a terminal block 13 supported in a normally retracted position by the plunger 14 of solenoid 15 which is adjustable toward and from the resonance chamber 10 by means of an adjusting screw 16. The effect of a spring 17 placed between the lower flanged end of the solenoid plunger 14 and the frame of the solenoid is to maintain the terminal block 13 and the magnetic loop 9 in a lowered or retracted position in which the loop is wholly uncoupled from the interior electromagnetic field of the resonance chamber 10. Upon energization of the solenoid 15, plunger 14 is drawn upwardly to project the loop 9 through an aperture 18 extending through the effective lower boundary wall of the resonance chamber 10. The supporting mechanism for the coupling loop and the solenoid structure for retracting and projecting the loop are disclosed in detail and claimed in application Serial No. 532,979, filed April 27, 1944, by W. F. Kannenberg, for Coupling devices, which issued as United States Patent 2,466,439, April 5, 1949.

At the upper end of the resonance chamber 10 there is a cover 19 supporting in fixed positions a column 20, a tubular guide 21 and an adjusting frame 22. Hinged at the point 23 on column 20 is a frame plate 24 upon which is mounted a small electrical motor 25 with a horizontal driving shaft extending transversely to and through plate 24. On the shaft of the motor 25 there is an eccentric 26 with which is mechanically connected an elastic metallic strap and a piston rod 27 supporting the piston 28 for reciprocation in a vertical direction within the upper portion of the resonance chamber 10. Frame 22 serves as a guide for the adjusting block 29 through which passes the threaded adjusting screw 30 retained in position at its lower end by a supporting bearing on the cover 19 and at its upper end by collars clamped thereon on opposite sides of a horizontal projecting portion of the frame 22 through which the screw 30 passes. Screw 30 moves block 29 which carries a pin 31 astride of which is a slot in the free end of frame member 24. It will be apparent, therefore, that upon turning the head 32 of the adjusting screw 30, the normal positions of the frame 24 and, consequently, of the motor 25 carried thereby and the piston 28 supported from the shaft of the motor may be adjusted up or down at the will of the attending operator. It will also be apparent that upon closure of the remote key 33 to close the circuit including source 34, the solenoid 15 and the motor 25, the motor will be set in operation and through the operation of the eccentric 26 will cause tuning plunger 28 to move in a vertical reciprocating manner about the mean position determined by the setting of the screw 30. The mechanism for causing the tuning plunger 28 to reciprocate and for setting its mean position is disclosed in detail and claimed in application Serial No. 544,990, filed July 14, 1944, by W. F. Kannenberg, J. P. Kinzer, C. W. Schramm and I. G. Wilson, for Testing systems. It will accordingly be apparent that after the radio object locator has been energized the test equipment may be placed in receiving condition by closure of the key 33 to project the coupling loop 9 into effective coupling position with the resonance chamber 10 and to set the motor-driven tuner in operation through actuation of the motor 25.

Resonance chambers are frequently found to have many natural resonance frequencies, some of which may be sufficiently close to a desired response to have a disturbing effect thereupon. In the case of cylindrical resonators of the type shown, certain transverse electric and transverse magnetic modes of oscillation occur in pairs which, in the case of a preferred mechanical structure, are at identical frequencies. For example, the mode known as $TE_{011}$ and the mode known as $TM_{111}$ occur at the same resonant frequencies in a structure such as that illustrated. This fact raises a serious problem in that it is difficult, if not impossible, to either excite within the chamber or to extract from it oscillations of one mode without, at the same time, exciting or extracting oscillations of the other mode. It happens that in an ideal cylindrical resonator oscillations of the $TE_{011}$ mode have a Q which is considerably higher than that of oscillations of the identical frequency but of the $TM_{111}$ mode. Since the effectiveness of a phantom target or test system of the type under consideration depends to a large extent upon the Q of the resonance chamber, it is desirable to be able to take advantage of the high Q of the $TE_{011}$ mode without the disadvantage of the encumbering low Q $TM_{111}$ mode. Accordingly, one should employ whatever techniques will be advantageous for enhancement of the $TE_{011}$ mode of oscillation without corresponding enhancement of the $TM_{111}$ mode or will tend to suppress oscillations of the $TM_{111}$ mode with degradation of oscillations of the $TE_{011}$ mode.

The Q of a cylindrical resonance chamber is, as has been stated, higher for a transverse electric mode of oscillation than for a corresponding frequency transverse magnetic mode. Moreover, the Q increases with the order of the mode and it is accordingly often desirable to take advantage of this fact in design of such apparatus.

One factor which is of importance in determining the internal loss of a resonance chamber is the skin depth to which electrical oscillations may penetrate in the inner wall of the chamber. By making the inner walls as smooth as possible and by coating them with a layer of silver 36, as shown, the internal loss may be reduced. It has been found also that for certain modes of oscillations and in particular for the higher order $TE_{01n}$ types the factor of parallelism of the end walls is very important. The effect of lack of parallelism is noticeable at substantially all frequencies for which resonance chambers of practicable dimensions may be constructed. It becomes increasingly important as the wavelength is reduced and in the case of wavelengths of 3 centimeters and less it is very important. In order to assure that the end walls of the resonator 10 may have inner plane surfaces very accurately parallel to each other, instead of employing the lower cap member 37 as the end wall, there is provided a metallic disc 38 which may be cut from a thin sheet or which may be coated or plated on a supporting backing as illustrated in Fig. 1. Referring to Fig. 3 in which the structure is shown in more detail the high conductivity coating 38 forming the lower electrical end wall of the electrical resonance chamber is attached to a relatively thick disc 39 of dielectric material as, for example, the phenol formaldehyde condensation product, commonly sold under the trade-mark "Bakelite." The disc 39 fits loosely within the cylindrical walls of the chamber 10. The disc 38 of conducting material is of less diameter than the interior space of resonance chamber 10 so that there is a substantial electrical discontinuity between the disc 38 and the surrounding conducting wall.

The dielectric disc 39 is pivotally supported by a flexible central support such as the ball and socket joint including the member 40, the rounded end of which serves as a pivot and which is held in position with reference to disc 39 by the cross-shaped supporting plate 41 cemented or otherwise attached thereto. Member 40 is provided with a collar 42, a screw-threaded portion and a locking nut 43 to fix it definitely with reference to the lower cap 37. In order to adjust the plane of the metallic coating 38 so as to be accurately parallel with the plane of the similar coating 44 on the plunger 28, two pairs of diametrically opposite adjusting bolts 45 are provided. It will be readily apparent that by adjusting one pair of bolts and then the other the surface of end wall 38 may be very precisely adjusted with reference to that of the end wall comprising coating 44.

For oscillations of the $TE_{01n}$ mode the electrical discontinuity or peripheral gap between the coating 38 and the cylindrical wall of the chamber 10 presents no large attenuation. However, for oscillations of the $TM_{11n}$ mode of the same frequency this discontinuity presents high attenuation. This desirable effect of reduction of the intensity of the low Q $TM_{11n}$ oscillations is accompanied by a corresponding gain in the intensity of the high Q $TE_{01n}$ oscillations. In order to accentuate this effect still further the coating 44 at the other end of the chamber is, likewise, given such a diameter as to provide a substantial discontinuity between its perimeter and the conducting walls of the conductor 10.

The discrimination in favor of oscillations of $TE_{01n}$ mode and against equal frequency oscillations of $TM_{11n}$ mode may be made still greater by the use of an attenuating material placed behind the annular gaps at the margins of disc 44 and disc 38. This is a principal function of the dielectric material 39 and of the corresponding dielectric material used as the backing of plunger 28. This dielectric material extends beyond the margins of the two end plates and is therefore in the field of the unwanted oscillations extending between each of the end plates 38, 44 and the cylindrical wall of resonance chamber 10. In order to still further attenuate the energy of the unwanted oscillations, that portion of the chamber lying beyond the inner surfaces 38 and 44 may have a surface of higher resistivity than the useful central portion of the resonance chamber. This may be effectel by omitting silver plating of the interior surfaces from the upper cap 19 and the lower cap 37. It has been found that the natural unplated aluminum surface of such a resonance chamber is effective for this purpose.

The effect of either dielectric attenuators or of high skin resistance surfaces back of the gaps is to augment the importance of parallelism between the end plates. Apparently any lack of parallelism results in direction of some energy of the desired mode into the attenuation zone. Accordingly, if such attenuation devices are used even with much longer wavelengths the factor of parallelism of the end plates must receive careful attention.

The effect of the annular slots is to increase the necessity of having the end walls parallel.

In operation, the transmitter emits pulses of say a microsecond duration, the oscillations being of the order of 3 centimeters in wavelength. During emission of a pulse receiver 5 is effectively paralyzed because of the action of the high energy outgoing pulse in the transmit-receive switch 4. Also, during the impulse emission period pickup device 7 is receiving energy so that if the apparatus has been energized to project the loop 9 into the interior field to the position shown the energy builds up the electromagnetic field within the resonance chamber 10. Upon cessation of the impulse, energy is fed out from the chamber by the same path by which it was introduced and it will continue to be supplied to the antenna 2 of the radio locator for a time determined largely by the resonance persistence characteristic of the resonance chamber 10. During this return of energy to the radio locator the receiver has been put in sensitive receiving condition by recovery of the transmit-receive switch from its momentary condition. The cathode-ray oscilloscope 6 connected to the receiver 5 presents a visual graph showing the relation between the intensity of received pulse and time.

Assuming that the object locator transmitter antenna 2 is moving relative to the pickup antenna 11 and that the resonance chamber tuning motor 25 is in operation, if the normal tuning of the resonance chamber has been properly adjusted by means of screw 32, a plurality of spires 64, 65 will show on the screen of oscilloscope 6 each representing the energy returned to the object locator received by the resonance chamber 10 of the phantom target, after an impulse which occurs at the time when the resonance chamber is tuned to the transmitter frequency The oscilloscope 6 may be provided in the usual manner with a horizontal sweep circuit to cause the individual pulse echoes to be separated as indicated. It is also provided with a vertical sweep so much more rapid than the horizontal sweep that for each impulse the echo is indicated with its initial portion appearing as a point near the base line on the oscilloscope and successive portions appearing substantially vertically above that point as long as the echo persists. It will be apparent that each echo will be shown as a vertical trace, the height of which is an indication of the duration of the echo. The duration of the echo in turn depends upon a number of factors including the relative positions of the transmitting and receiving antenna, the persistence of the resonator, the tuning of the radio receiver, etc. As the transmitter antenna moves in a direction toward a more favorable position with respect to the phantom target the spires increase in length thus evidencing the increasing electric field building effect in the resonator. Moreover, the results of variation of any of the factors of the entire chain of elements of the testing system such as the current supply of the object locator transmitter, the transmission efficiency of the path from the transmitter to the antenna 2, the attenuation of the coaxial circuit 8, the efficiency of energy transfer of loop 9, the resonance agreement of chamber 10 with the transmitter frequency or the tuning adjustment of the object locator receiver will appear as changes in the height of the spires. In the initial adjustment of the test apparatus on the ground when the resonance chamber is accessible to a test operator or his assistant, adjustment screw 32 is turned until the maximum number of evenly spaced spires is seen on the oscilloscope. This adjustment is not critical, however, and equally spaced spires are desirable only in order to allow for later frequency drift to be large and in either direction without getting out of the range through which the resonance chamber varies under control of the motor-driven tuner. The receiver tuning may then be adjusted by changing the frequency of the beating oscillator of the object locator receiver until maximum length of spires is seen on the oscilloscope. When a test of an air-borne object locator is to be made during flight, two things may be readily determined. In the first place, the tuning of the receiver of the radio object locator may be checked as before by adjusting the frequency of the beat oscillator to obtain maximum length of spires. Whether the spacing of these spires is still equal or not is of no great importance but it does indicate whether there has been a drift between the frequency of the radio transmitter and the mean frequency of the phantom target apparatus as adjusted on the ground. In the second place, performance of the radio object locator may be checked to determine how well it will detect distant targets. The operator compares the length of the spires with the previous measurement made when the radio object locator was known to be in good condition and capable of detecting distant targets. For an object locator having a peak output of from 20 to 100 kilowatts and good signal-to-noise ratio, the maximum echo obtainable should be 20 to 25 microseconds corresponding to the echo time of an object at a distance of 2 to 2.5 statute miles. It will be found, therefore, that the test apparatus shown is extremely useful in enabling a check of the radio object locator to be made, particularly while the object locator is being used for searching purposes.

In the normal condition of the test apparatus with the key 33 open the test apparatus has substantially no effect upon the radio object locator since its energy pickup is effectively disconnected from the resonance chamber and the test apparatus, therefore, does not serve to store up energy for retransmission. The pickup device 7 of the test equipment is preferably placed at such a position near the margin of the effective field of the radio transmission as to have little or no direct effect upon that field.

By virtue of the fact that resonance chamber 10 may remain highly resonant but has its resonance frequency varied over a considerable range by the motor, assurance is had that the transmitter will not undergo such frequency variation as to fail to effectively energize the resonance chamber. Accordingly, it remains only to adjust tuning of the radio receiver. The test equipment, therefore, remains available for instant use to insure at all times that the radio object locator is effective without, however, disabling the object locator for more than the very brief interval required to observe the test impulse pattern on the cathode-ray oscilloscope 6.

In this specification and the claims the words cylinder and cylindrical are employed in the generic sense of a volume bounded by two parallel planes and a closed surface intersecting both planes and generated by a straight line moving so as to remain parallel to a fixed straight line.

In actual phantom target apparatus of the type disclosed in Fig. 1 in the 10 centimeter range a TE₀₁₁ mode of oscillation was used; for 3 centimeters a TE₀₁₁₇ mode. The 3 centimeter wave resonator was a cylinder having an internal length of 13 inches measured between the effective end walls and an internal diameter of 3⅜ inches. The resonator itself may consist of copper, brass, spun aluminum or even of non-conducting material if plated or coated inside with a good conductor such as silver. The tuning plunger conductive plate 44 may be about ⅛ inch less in diameter than the interior of the cylinder 10 so as to leave a peripheral gap of 1/16 inch and the disc 22 of dielectric material may be about 1/16 inch larger in diameter than the plate 44 so as to extend beyond the plate 1/32 inch at its edges. The range of tuning which the motor-driven plate 44 effects need not be large and in general may be of the order of ±0.1 per cent. It is desirable that it exceed the range of frequency shift of the transmitter with normal voltage and temperature variations.

What is claimed is:

1. An electrical resonance chamber having a plane wall movably mounted with respect to the remainder of the chamber, means for moving said wall with respect to the remainder of the chamber to vary the natural resonance of the chamber, said chamber having a second plane wall opposite the resonance-varying wall, one of said plane walls being pivotally mounted to permit shifting its plane with reference to the chamber, the pivotal mounting being wholly independent of the means for varying the position of the movably mounted wall to vary the natural resonance of the chamber and means for adjusting said pivotally mounted wall to a position of parallelism with the other plane wall.

2. An electrical resonance chamber having two movable plane walls substantially opposite each other, means for supporting one of said walls slidably with respect to the chamber so as to permit its plane to be advanced toward or withdrawn from the interior of the chamber and means for supporting the other wall at its center pivotally with respect to the chamber and means for adjusting the position of the marginal portions of the second wall to bring its plane into parallelism with that of the first plane wall.

3. An electrical resonance chamber having one wall mounted on the chamber in slidable manner so as to be movable forwardly and backwardly as a whole in a single direction, said chamber having a second wall generally parallel to the first wall and pivotally mounted on the chamber and means for adjusting the position of the second wall to bring each of its points into equidistant relation to corresponding points of the first wall.

4. A cylindrical resonance chamber having two plane interior walls at opposite ends of the chamber, one of said walls being mounted on the chamber for motion in a direction perpendicular to its plane into positions such as to maintain its interior surface parallel to its original position, the opposite plane wall having a pivotal mounting with respect to said chamber, and means for adjusting the plane of said opposite wall into parallelism with the first wall.

5. A space resonator comprising a cylindrical chamber having walls of electrically conducting material, two opposite end walls having plane interior surfaces, one of said end walls being slidably mounted on the chamber to vary the separation of the interior surfaces without affecting the direction of the plane of its interior surface, the other end wall being mounted on a central pivot to permit variation of the direction of the plane of its interior surface whereby the two interior surfaces may be brought into parallelism, and means for fixing both end walls in any position to which they may have been adjusted.

WILLIAM A. EDSON.
WALTER F. KANNENBERG.

REFERENCES CITED

The following references are of record in the file of this patent:

UNITED STATES PATENTS

| Number | Name | Date |
|---|---|---|
| 2,044,413 | Weyrich | June 16, 1936 |
| 2,106,769 | Southworth | Feb. 1, 1938 |
| 2,151,118 | King | Mar. 21, 1939 |
| 2,281,550 | Barrow | May 5, 1942 |
| 2,362,561 | Katzin | Nov. 14, 1944 |
| 2,383,343 | Ryan | Aug. 21, 1945 |